Patented Jan. 23, 1951

2,539,325

UNITED STATES PATENT OFFICE 2,539,325

PROCESS OF PRODUCING THIOAMIDES

Jiří Procházka, Prague, Czechoslovakia, assignor to Bata, narodni podnik, Zlin, Czechoslovakia No Drawing. Application February 25, 1947, Serial No. 730,757. In Germany November 16, 1942

Section 1, Public Law 690, August 8, 1946
Patent expires November 16, 1962

3 Claims. (Cl. 260—239.3)

According to the U. S. A. Patent No. 2,201,200 the production of cyclic thioamides (thiolactams) is carried out by the action of hydrogen sulphide on aminonitriles of the ω-amino-carboxylic acids. This process is troublesome, the raw material is hardly accessible, the reaction must be carried out very carefully and the yield is small.

It has been found that thiolactams may be produced in a simple way by the action of carbon disulphide on lactams. This reaction is in a certain respect analogous to that of phosphorouspentasulphide. The carbondisulphide is converted to carbonylsulphide and finally perhaps to carbondioxide, wherein the carbonyl oxygen is replaced by sulphur. When using an excess of carbondisulphide, the reaction products consist for the most part of carbonyl sulphide and thiolactam. In most cases the reaction is preferably carried out under a high pressure and at a high temperature, i. e. using an autoclave and at a temperature above the boiling point of the respective lactam. After the reaction is complete, the excess of the carbondisulphide is removed by distillation in vacuum or by crystallization. The yields obtained are much better than those obtained by means of the process used heretofore.

EXAMPLE

*Production of 6-caprothiolactam*

150 g. of 6-caprolactam are heated with 750 g. of carbondisulphide in an autoclave for 14 hours at a temperature of 240° C. The pressure increased in the course of the reaction to 80–90 atm., an interior pressure of 15 atm. still remaining after the cooling. The escaped gas contained carbonylsulphide. The product is freed from carbonyldisulphide by distillation. It distilled at temperatures ranging from 180 to 190° C. at a pressure of 18 mm. Hg. The 6-caprothiolactam is crystallized from benzene or toluene, and has a melting point of 105–105.5° C. A yield of 62 grams was obtained. A substantial amount (76 grams) of an undistillable polymer remained in the still. For this reason it is advisable not to distil the thiolactam, but to crystallize it and not to use too high a temperature in the autoclave. In the preparation of thiopyrrolidone, it is sufficient to heat for 2 hours at a temperature of 200° C. whereby an almost quantitative yield is obtained.

I claim:

1. Process of producing a thiolactam selected from the group consisting of 4-butyrothiolactam and 6-caprothiolactam, comprising reacting a lactam selected from the group consisting of 4-butyrolactam and 6-caprolactam with carbon disulphide at an increased temperature and under increased pressure.

2. Process of producing 4-butyrothiolactam from 4-butyrolactam, comprising reacting said 4-butyrolactam with carbon disulphide at an increased temperature and under increased pressure.

3. Process of producing 6-caprothiolactam from 6-caprolactam, comprising reacting said 6-caprolactam with carbon disulphide at an increased temperature and under increased pressure.

JIŘÍ PROCHÁZKA.

REFERENCES CITED

The following references are of record in the file of this patent:

UNITED STATES PATENTS

| Number | Name | Date |
|---|---|---|
| 2,143,816 | Jacobson | Jan. 10, 1939 |
| 2,201,200 | Pinkney | May 21, 1940 |
| 2,301,964 | Martin | Nov. 17, 1942 |
| 2,357,484 | Martin | Sept. 5, 1944 |

FOREIGN PATENTS

| Number | Country | Date |
|---|---|---|
| 611,248 | Germany | Mar. 25, 1935 |

OTHER REFERENCES

Tafel et al., Ber. der. Deu. Chemie, vol. 38 (1905), p. 1592.

Tafel et al., Ber. der. Deu. Chemie, vol. 40 (1907), pp. 2842–2848.

Chem. Abst., vol. 27, page 2443 (1933).

Campaigne: Chem. Rev., vol. 39, page 22 (1946; received for publication November 23, 1945).